(12) United States Patent
Qian et al.

(10) Patent No.: US 11,733,412 B2
(45) Date of Patent: Aug. 22, 2023

(54) METHOD AND DEVICE FOR DETERMINING EXCITATION POINT OF SEISMIC SOURCE

(71) Applicant: China University of Geosciences (Beijing), Beijing (CN)

(72) Inventors: Rongyi Qian, Beijing (CN); Yukun Yang, Beijing (CN); Jian Li, Beijing (CN)

(73) Assignee: China University of Geosciences (Beijing), Beijing (CN)

( * ) Notice: Subject to any disclaimer, the term of this patent is extended or adjusted under 35 U.S.C. 154(b) by 407 days.

(21) Appl. No.: 16/993,308

(22) Filed: Aug. 14, 2020

(65) Prior Publication Data

US 2021/0116590 A1    Apr. 22, 2021

(30) Foreign Application Priority Data

Oct. 18, 2019   (CN) .......................... 201910993193.8

(51) Int. Cl.
| | |
|---|---|
| *G01V 1/28* | (2006.01) |
| *G01V 1/02* | (2006.01) |
| *B64C 39/02* | (2023.01) |
| *G01S 19/45* | (2010.01) |
| *G06N 5/04* | (2023.01) |
| *G06N 20/00* | (2019.01) |
| *B64U 101/00* | (2023.01) |

(52) U.S. Cl.
CPC ............ *G01V 1/282* (2013.01); *B64C 39/024* (2013.01); *G01S 19/45* (2013.01); *G01V 1/02* (2013.01); *G06N 5/04* (2013.01); *G06N 20/00* (2019.01); *B64U 2101/00* (2023.01); *B64U 2201/104* (2023.01); *G01V 2210/14* (2013.01)

(58) Field of Classification Search
CPC . G01V 1/282; G01V 1/00; G01V 1/02; G01V 1/04; G01V 1/09; G01V 1/13; G01V 2210/1295
See application file for complete search history.

(56) References Cited

U.S. PATENT DOCUMENTS

2016/0154127 A1\* 6/2016 Shevchenko .......... G01V 1/282
                                                            703/2
2021/0080604 A1\* 3/2021 Deschizeaux ........ G01V 1/3835

FOREIGN PATENT DOCUMENTS

CN      103592627 A  \*  2/2014  ............. G01S 19/42
CN      106970415 A  \*  7/2017  ............. G01C 21/00

\* cited by examiner

*Primary Examiner* — Manuel L Barbee
(74) *Attorney, Agent, or Firm* — Shih IP Law Group, PLLC

(57) ABSTRACT

The present invention provides a method and device for determining an excitation point of a seismic source. The method includes: determining, according to a selected medium type, a distribution region corresponding to the selected medium type in a three-dimensional surface model corresponding to a preset surface range, where a preset position of the excitation point of the seismic source is located in the preset surface range, and a first mapping position corresponding to the preset position of the excitation point of the seismic source is located in the three-dimensional surface model; determining a second mapping position in the three-dimensional surface model according to the first mapping position and the determined distribution region; and determining, according to the second mapping position, a target position of the excitation point of the seismic source corresponding to the second mapping position in the preset surface range.

9 Claims, 2 Drawing Sheets

METHOD AND DEVICE FOR DETERMINING EXCITATION POINT OF SEISMIC SOURCE

TECHNICAL FIELD

The present invention relates to the technical field of seismic exploration, in particular to a method and device for determining an excitation point of a seismic source.

BACKGROUND OF THE INVENTION

Seismic exploration is a geophysical exploration method for observing and analyzing the response of the earth to seismic waves excited manually according to the elasticity difference and density difference of underground media to infer the nature and morphology of underground rock strata.

The seismic waves excited manually on the surface will be reflected and refracted by an interface between rock strata with different medium properties when propagated into the ground, and the reflected and refracted seismic waves are received by geophones on the surface or in wells. The received seismic waves are related to the properties of seismic sources, positions of receiver points, and the nature and structure of the underground rock strata in which the seismic waves are propagated, so that the nature and morphology of the underground rock strata can be inferred by processing and interpreting the received seismic waves.

In the prior art, explorers select an excitation point of a seismic source ordinarily based on experience. Due to subjective factors, seismic sources may be arrayed incorrectly, resulting in errors in seismic exploration results.

SUMMARY OF THE INVENTION

To solve the problems in the prior art, the present invention provides a method and device for determining an excitation point of a seismic source.

In a first aspect, the present invention provides a method for determining an excitation point of a seismic source, including:
determining, according to a selected medium type, a distribution region corresponding to the selected medium type in a three-dimensional surface model corresponding to a preset surface range, where a preset position of the excitation point of the seismic source is located in the preset surface range, and a first mapping position corresponding to the preset position of the excitation point of the seismic source is located in the three-dimensional surface model which manifests medium types and distribution regions corresponding to the medium types in the preset surface range;
determining a second mapping position in the three-dimensional surface model according to the first mapping position and the determined distribution region; and
determining, according to the second mapping position, a target position of the excitation point of the seismic source corresponding to the second mapping position in the preset surface range.

Further, the step of determining a second mapping position in the three-dimensional surface model according to the first mapping position and the determined distribution region includes:
determining a geometric center point in the distribution region; and
determining the second mapping position on a line connecting the first mapping position to the geometric center point.

Further, the step of determining the second mapping position on a line connecting the first mapping position to the geometric center point includes:
determining a point of intersection between the line and a boundary of the distribution region; and
determining a point spaced from the point of intersection, which is regarded as a starting point, by a distance of a seismic source diameter in a direction from the line to the geometric center point to serve as the second mapping position.

Further, before the step of determining, according to a selected medium type, a distribution region corresponding to the selected medium type in a three-dimensional surface model, the method further includes:
building, according to image data in the preset surface range, the three-dimensional surface model corresponding to the preset surface range based on an artificial intelligence recognition technology.

Further, before the step of building, according to image data in the preset surface range, the three-dimensional surface model corresponding to the preset surface range based on an artificial intelligence recognition technology, the method further includes:
determining the preset position of the excitation point of the seismic source according to one or more of a coordinate of peg mark numbers of geophones, an offset, a spacing, and the number of overlaying to make sure that an unmanned aerial vehicle (UAV) flies to an aerial acquisition position corresponding to the preset position of the excitation point of the seismic source and acquires the image data in the preset surface range at the aerial acquisition position.

Further, the method includes:
determining an aerial drop position of the seismic source according to the target position of the excitation point of the seismic source to make sure that the UAV drops the seismic source at the aerial drop position.

Further, the UAV automatically navigates by means of a Global Position System (GPS) locator and a laser rangefinder to fly to the aerial acquisition position and the aerial drop position.

In a second aspect, the present invention provides a device for determining an excitation point of a seismic source, including:
a distribution region determining module, used to determine, according to a selected medium type, a distribution region corresponding to the selected medium type in a three-dimensional surface model corresponding to a preset surface range, where a preset position of the excitation point of the seismic source is located in the preset surface range, and a first mapping position corresponding to the preset position of the excitation point of the seismic source is located in the three-dimensional surface model which manifests medium types and distribution regions corresponding to the medium types in the preset surface range;
a second mapping position determining module, used to determine a second mapping position in the three-dimensional surface model according to the first mapping position and the determined distribution region; and
a module for determining an excitation point of a seismic source, used to determine, according to the second mapping position, a target position of the excitation point of the seismic source corresponding to the second mapping position in the preset surface range.

In a third aspect, the present invention provides an electronic device, including a memory, a processor, and a computer program stored in the memory and able to run in the processor, where the processor performs steps of the method described in the first aspect when running the computer program.

In a fourth aspect, the present invention provides a non-transitory computer-readable storage medium, having a computer program stored therein, where a processor performs steps of the method described in the first aspect when running the computer program.

According to the method and device for determining an excitation point of a seismic source in the present invention, a three-dimensional surface model corresponding to a preset surface range in which a preset position of the excitation point of the seismic source is located is built, and a medium type is selected from all medium types in the preset surface range as required; then a distribution region corresponding to the selected medium type is determined in the three-dimensional surface model; and finally, a second mapping position is determined according to a first mapping position and the distribution region, and a position corresponding to the second mapping position is determined in the preset surface range to serve as a target position of the excitation point of the seismic source. The influence of surface conditions on excitation quality is taken into consideration, so that the accuracy of seismic explorations is improved.

BRIEF DESCRIPTION OF DRAWINGS

To describe the technical solutions in the present invention or in the prior art more clearly, the following briefly introduces the accompanying drawings required for describing the examples or the prior art. Apparently, the accompanying drawings in the following description show some examples of the present invention, and those of ordinary skill in the art may still derive other drawings from these accompanying drawings without creative efforts.

DETAILED DESCRIPTION OF THE PREFERRED EMBODIMENT

In order to make the objectives, technical solutions and advantages of the present invention clearer, the following clearly and completely describes the technical solutions in the present invention with reference to accompanying drawings in the present invention. Apparently, the described examples are some rather than all of the examples. All other examples obtained by those of ordinary skill in the art based on the present invention without creative efforts shall fall within the protection scope of the present invention.

Seismic exploration most important in geophysical exploration is the most effective way to perform oil and gas exploration. Moreover, the seismic exploration is indispensable to exploration on petroleum and natural gas resources before drilling, and is widely applied to exploration on coal fields and engineering geology, research on regional geology, and research on the crust. In the prior art, explorers select an excitation point of a seismic source ordinarily based on experience. Due to subjective factors, seismic sources may be arrayed incorrectly, resulting in errors in seismic exploration results.

Figure 1:
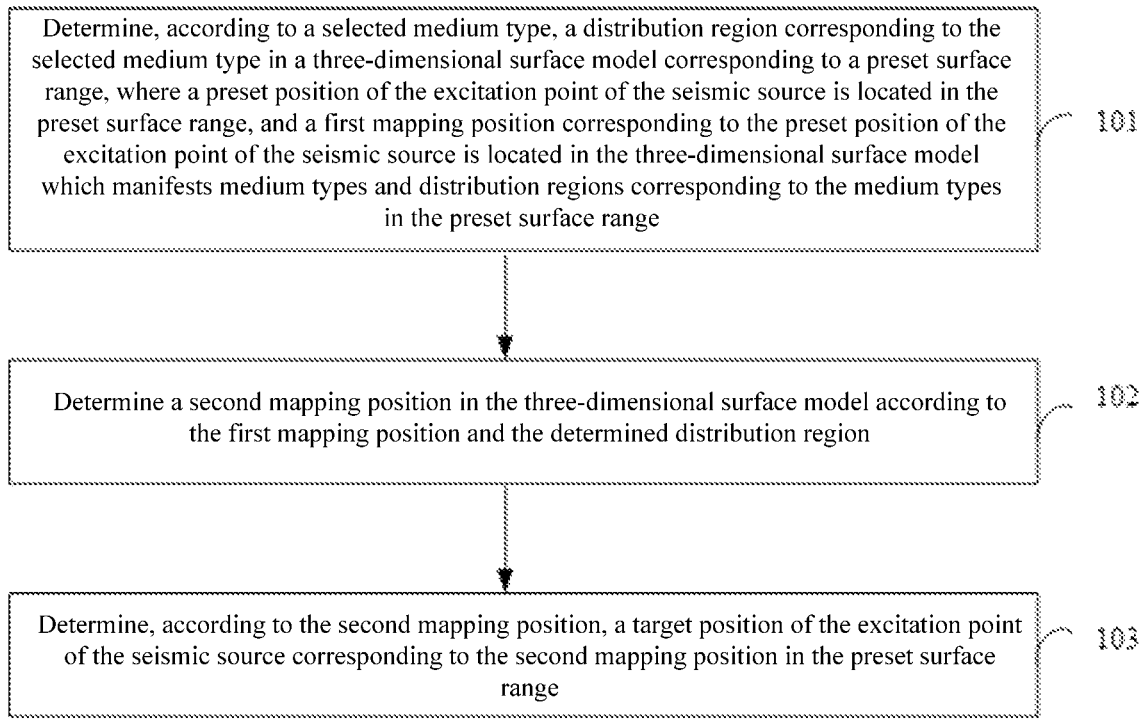
FIG. 1 is a flow chart of a method for determining an excitation point of a seismic source in an example of the present invention.

To solve the problems in the prior art, an example of the present invention provides a method for determining an excitation point of a seismic source. As shown in FIG. 1 which shows a flow chart of the method for determining an excitation point of a seismic source in the example of the present invention, the method includes:

Step 101. determine, according to a selected medium type, a distribution region corresponding to the selected medium type in a three-dimensional surface model corresponding to a preset surface range, where a preset position of the excitation point of the seismic source is located in the preset surface range, and a first mapping position corresponding to the preset position of the excitation point of the seismic source is located in the three-dimensional surface model which manifests medium types and distribution regions corresponding to the medium types in the preset surface range;

Step 102. determine a second mapping position in the three-dimensional surface model according to the first mapping position and the determined distribution region; and Step 103. determine, according to the second mapping position, a target position of the excitation point of the seismic source corresponding to the second mapping position in the preset surface range.

Particularly, in this example of the present invention, the three-dimensional surface model corresponding to the preset surface range in which the preset position of the excitation point of the seismic source is located is obtained first, where the preset position of the excitation point of the seismic source is manually selected and is not used for excitation of a man-made earthquake, and a manner of selecting the preset position of the excitation point of the seismic source is not particularly limited in the example of the present invention; the three-dimensional surface model manifests the medium types and the distribution regions corresponding to the medium types in the preset surface range; certainly, the preset position of the excitation point of the seismic source is also located in the three-dimensional surface model; and the preset position of the excitation point of the seismic source is mapped at the first mapping position in the three-dimensional surface model.

Surface conditions deeply affect excitation quality. In view of this, in an example of the present invention, the medium type is selected from all the medium types in the preset surface range as required; then the distribution region corresponding to the selected medium type is determined in the three-dimensional surface model, and a position is determined in the distribution region; and afterwards, a seismic source is excited at a position, in the preset surface range, corresponding to the position determined in the distribution region.

Finally, the second mapping position is determined according to the first mapping position and the distribution region, and a position corresponding to the second mapping position is determined in the preset surface range to serve as the target position of the excitation point of the seismic source. It should be noted that the target position of the excitation point of the seismic source is used for the excitation of the man-made earthquake generated by a seismic source.

According to the method in this example of the present invention, the three-dimensional surface model corresponding to the preset surface range in which the preset position of the excitation point of the seismic source is located is built, and the medium type is selected from all the medium types in the preset surface range as required; then the distribution region corresponding to the selected medium type is determined in the three-dimensional surface model; and finally, the second mapping position is determined according to the first mapping position and the distribution region, and the position corresponding to the second mapping position is determined in the preset surface range to serve as the target position of the excitation point of the seismic source. By taking the influence of the surface conditions on the excitation quality into consideration, the method for determining an excitation point of a seismic source in the example of the present invention improves the accuracy of seismic explorations.

Based on any one of the above examples, the step of determining a second mapping position in the three-dimensional surface model according to the first mapping position and the determined distribution region includes:

determine a geometric center point in the distribution region; and determine the second mapping position on a line connecting the first mapping position to the geometric center point.

Particularly, the geometric center point in the distribution region corresponding to the selected medium type is determined after the distribution region is obtained; and then the first mapping position is connected to the geometric center point to form the line, and the second mapping position is determined on the line.

Based on any one of the above examples, the step of determining the second mapping position on a line connecting the first mapping position to the geometric center point includes:

determine a point of intersection between the line and a boundary of the distribution region; and determine a point spaced from the point of intersection, which is regarded as a starting point, by a distance of a seismic source diameter in the direction from the line to the geometric center point to serve as the second mapping position.

It is understandable that the distribution region corresponding to the selected medium type has a boundary. The point of intersection between the line and the boundary of the distribution region is determined; and then the point of intersection is shifted by a distance of the seismic source diameter towards the geometric center point in the distribution region to obtain a position serving as the target position of the excitation point of the seismic source.

Based on any one of the above examples, before the step of determining, according to a selected medium type, a distribution region corresponding to the selected medium type in a three-dimensional surface model corresponding to a preset surface range, the method further includes:

build, according to image data in the preset surface range, the three-dimensional surface model corresponding to the preset surface range based on an artificial intelligence recognition technology.

Based on any one of the above examples, before the step of building, according to image data in the preset surface range, the three-dimensional surface model corresponding to the preset surface range based on an artificial intelligence recognition technology, the method further includes:

determine the preset position of the excitation point of the seismic source according to one or more of a coordinate of peg mark numbers of geophones, an offset, a spacing, and the number of overlaying to make sure that an unmanned aerial vehicle (UAV) flies to an aerial acquisition position corresponding to the preset position of the excitation point of the seismic source and acquires the image data in the preset surface range at the aerial acquisition position.

Particularly, in this example of the present invention, selection of the preset position of the excitation point of the seismic source is explained. That is, all preset position of the excitation point of the seismic sources and the number of excitation are determined according to the coordinate of the peg mark numbers of the geophones, the offset, the spacing, the number of overlaying, and other seismic exploration requirements.

Where, the offset refers to the distance between a seismic exploration point and a geophone group center closest to the seismic exploration point; the spacing refers to the distance between seismic exploration points; the number of overlaying of an earthquake refers to the number of repeated observations in a method for repeatedly observing the same reflection point on an underground interface by means of seismic observation systems arranged in a specific form in the wild; and the offset, the spacing, and the number of overlaying are manually set as actually needed and are not limited in the example of the present invention.

It should be additionally noted that, in the example of the present invention, the image data is acquired by the UAV. It is understandable that the UAV is carried with a seismic source and an intelligent seismic source drop system used to drop the seismic source. Where, the seismic source refers to an object, such as an explosive, enabling a man-made earthquake to occur on the ground, and the selection of the seismic source is not particularly limited in the example of the present invention. The intelligent seismic source drop system can accurately drop the seismic source to a fixed point, and other functions of the intelligent seismic source drop system are not particularly limited in the example of the present invention.

The intelligent seismic source drop system includes a projector, a global position system (GPS) device, and a laser rangefinder. After a flight control system of the UAV acquires the preset position of the excitation point of the seismic source, the UAV automatically navigates by means of the GPS device and the laser rangefinder to fly to the aerial acquisition position corresponding to the preset position of the excitation point of the seismic source and then acquire the image data in the preset surface range at the aerial acquisition position.

Where, the aerial acquisition position is preferably located over the preset position of the excitation point of the seismic source and spaced from the preset position of the excitation point of the seismic source by a distance, which is set as required and is not limited in the example of the present invention. In this case, the preset surface range is preferably defined as a projection of the UAV on the ground and a vicinity thereof; and it is understandable that the preset position of the excitation point of the seismic source is inevitably located in the preset surface range.

Based on any one of the above examples, the method further includes:

determine an aerial drop position of the seismic source according to the target position of the excitation point of the seismic source to make sure that the UAV drops the seismic source at the aerial drop position.

It should be noted that the seismic source is dropped by the UAV in this example of the present invention. After the flight control system of the UAV acquires the target position of the excitation point of the seismic source, the UAV automatically navigates by means of the GPS device and the laser rangefinder to fly to the aerial drop position corresponding to the target position of the excitation point of the seismic source and then drop the seismic source to the ground at the aerial drop position, so that the seismic source is accurately dropped to the target position of the excitation point of the seismic source to excite the man-made earthquake.

According to the method in the example of the present invention, the seismic source is dropped to the ground by the UAV, so that the problems of difficulty in personnel coordination and operation complexity caused by seismic exploration fully manually performed in the prior art are solved; and furthermore, the surface conditions under which the seismic source is excited are taken into consideration in a case where the seismic source is dropped by the UAV, so that the error rate of the seismic exploration is lowered, and the seismic exploration is accurate.

Based on any one of the above examples, the UAV automatically navigates by means of a GPS locator and the laser rangefinder to fly to the aerial acquisition position and the aerial drop position.

Figure 2:
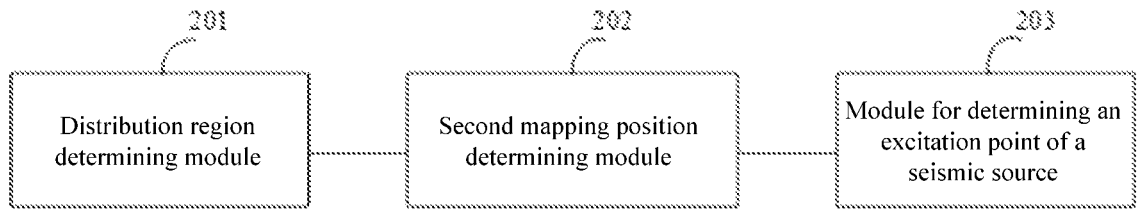
FIG. 2 is a structural diagram of a device for determining an excitation point of a seismic source in an example of the present invention.

Based on any one of the above examples, as shown in FIG. 2 which shows a structural diagram of a device for determining an excitation point of a seismic source in an example of the present invention, the device includes a distribution region determining module 201, a second mapping position determining module 202, and a module 203 for determining an excitation point of a seismic source.

The distribution region determining module 201 is used to determine, according to the selected medium type, the distribution region corresponding to the selected medium type in the three-dimensional surface model corresponding to the preset surface range, where the preset position of the excitation point of the seismic source is located in the preset surface range, and the first mapping position corresponding to the preset position of the excitation point of the seismic source is located in the three-dimensional surface model which manifests the medium types and the distribution regions corresponding to the medium types in the preset surface range; the second mapping position determining module 202 is used to determine the second mapping position in the three-dimensional surface model according to the first mapping position and the determined distribution region; and the module 203 for determining an excitation point of a seismic source is used to determine, according to the second mapping position, the target position of the excitation point of the seismic source corresponding to the second mapping position in the preset surface range.

Particularly, the device in the example of the present invention is used to implement the above method which is no longer repeated here. According to the device, the three-dimensional surface model corresponding to the preset surface range in which the preset position of the excitation point of the seismic source is located is built, and the medium type is selected from all the medium types in the preset surface range as required; then the distribution region corresponding to the selected medium type is determined in the three-dimensional surface model; and finally, the second mapping position is determined according to the first mapping position and the distribution region, and the position corresponding to the second mapping position is determined in the preset surface range to serve as the target position of the excitation point of the seismic source. By taking the influence of the surface conditions on the excitation quality into consideration, the device for determining an excitation point of a seismic source in the example of the present invention improves the accuracy of the seismic exploration result.

Figure 3:
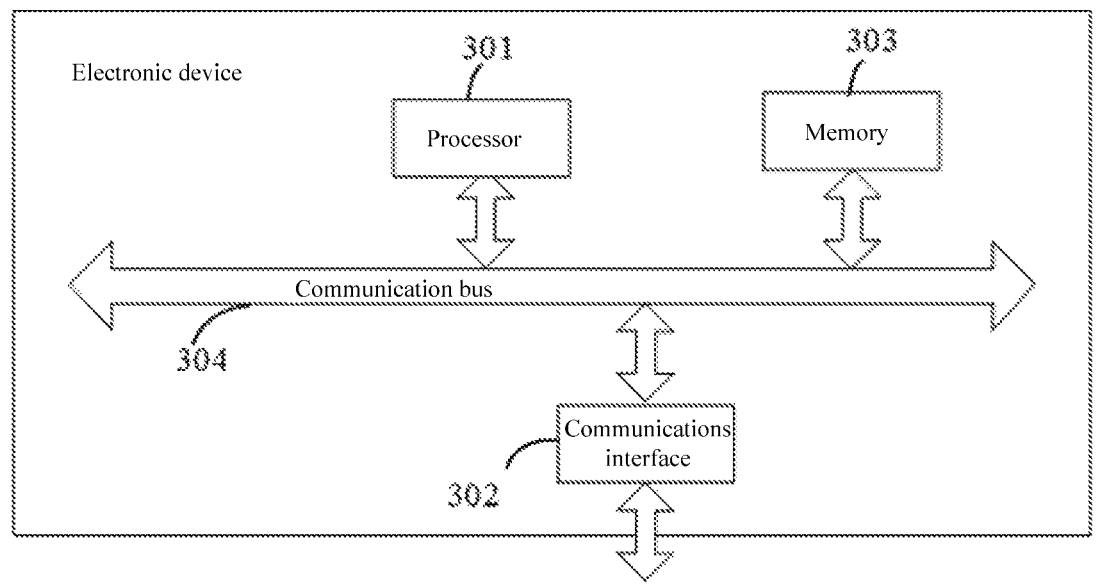
FIG. 3 is a schematic diagram of a physical structure of an electronic device in an example of the present invention.

As shown in FIG. 3 which shows a schematic diagram of a physical structure of an electronic device in an example of the present invention, the electronic device includes a processor 301, a communications interface 302, a memory 303, and a communication bus 304, where the processor 301, the communications interface 302, and the memory 303 communicate with one another through the communication bus 304; the processor 301 can invoke a computer program stored in the memory 303 and able to run in the processor 301 to implement the method in the above examples, for example, through the following steps: determine, according to a selected medium type, a distribution region corresponding to the selected medium type in a three-dimensional surface model corresponding to a preset surface range, where a preset position of the excitation point of the seismic source is located in the preset surface range, and a first mapping position corresponding to the preset position of the excitation point of the seismic source is located in the three-dimensional surface model which manifests medium types and distribution regions corresponding to the medium types in the preset surface range; determine a second mapping position in the three-dimensional surface model according to the first mapping position and the determined distribution region; and determine, according to the second mapping position, a target position of the excitation point of the seismic source corresponding to the second mapping position in the preset surface range.

Besides, a logic instruction in the memory 303 can be implemented as a software function unit and be stored in a computer-readable storage medium when sold or used as a separate product. Based on such understanding, the technical solution of the present invention, in essence, a part contributing to the prior art, or part of the technical solution may be embodied as a software product, and the computer software product is stored in a storage medium and includes a plurality of instructions for making a computer device (which may be a personal computer, a server, or a network device) perform all or some the steps of the method in the present invention. The storage medium has the computer software product stored therein includes: a USB flash disk, a mobile hard disk, a read-only memory (ROM), a random access memory (RAM), a magnetic disk, an optical disk, or other media capable of storing program codes.

An example of the prevent invention further provides a non-transitory computer-readable storage medium having a computer program stored therein. When the computer program is run in a processor, the processor implements the transmission method in the above examples, for example, through the following steps: determine, according to a selected medium type, a distribution region corresponding to the selected medium type in a three-dimensional surface model corresponding to a preset surface range, where a preset position of the excitation point of the seismic source is located in the preset surface range, and a first mapping position corresponding to the preset position of the excitation point of the seismic source is located in the three-dimensional surface model which manifests medium types and distribution regions corresponding to the medium types in the preset surface range; determine a second mapping position in the three-dimensional surface model according to the first mapping position and the determined distribution region; and determine, according to the second mapping position, a target position of the excitation point of the seismic source corresponding to the second mapping position in the preset surface range.

The device examples described above are only schematic, where units described as separate components may or may not be physically separated. Components displayed as units may or may not be physical units, that is, the components may be located in one place, or may be distributed to multiple network units. Some or all of the modules may be selected according to actual needs to achieve the objective of the solution of the example. Those of ordinary skill in the art can understand and implement the example without creative efforts.

Through the description of the foregoing examples, those skilled in the art can clearly understand that the examples can be implemented by means of software plus a necessary universal hardware platform, or certainly, can be implemented through hardware. Based on such understanding, the technical solution, in essence, or the part contributing to the prior art may be embodied as the software product, the computer software product may be stored in the computer-readable storage medium, such as the ROM/RAM, the magnetic disk or the optical disk, and includes the plurality of instructions for making the computer device (which may be the personal computer, the server, or the network device) to implement the method in the examples or parts of the examples.

Finally, it should be noted that the foregoing examples are only used to explain the technical solutions of the present invention, and are not intended to limit the same. Although the present invention is described in detail with reference to the foregoing examples, those of ordinary skill in the art should understand that they can still modify the technical solutions described in the foregoing examples, or make equivalent substitutions on some technical features therein. These modifications or substitutions do not make the essence of the corresponding technical solutions deviate from the spirit and scope of the technical solutions of the present invention.

What is claimed is:

1. A method for determining an excitation point of a seismic source, comprising:
    determining a preset position of the excitation point of the seismic source according to one or more of a coordinate of peg mark numbers of geophones an offset, a spacing, and the number of overlaying to make sure that an unmanned aerial vehicle (UAV) flies to an aerial acquisition position corresponding to the preset position of the excitation point of the seismic source and acquires image data in a preset surface range at the aerial acquisition position;
    building, according to the image data in the preset surface range, a three-dimensional surface model corresponding to the preset surface range based on an artificial intelligence recognition technology;
    determining, according to a selected medium type, a distribution region corresponding to the selected medium type in the three-dimensional surface model corresponding to the preset surface range, wherein the preset position of the excitation point of the seismic source is located in the preset surface range, and a first mapping position corresponding to the preset position of the excitation point of the seismic source is located in the three-dimensional surface model which manifests medium types and distribution regions corresponding to the medium types in the preset surface range;
    determining a second mapping position in the three-dimensional surface model according to the first mapping position and the determined distribution region;
    determining, according to the second mapping position, a target position of the excitation point of the seismic source corresponding to the second mapping position in the preset surface range; and
    determining an aerial drop position of the seismic source according to the target position of the excitation point of the seismic source to make sure that the UAV drops the seismic source at the aerial drop position; wherein the UAV automatically navigates by means of a Global Position System (GPS) locator and a laser rangefinder to fly to the aerial acquisition position and the aerial drop position.

2. The method according to claim 1, wherein the operation of determining the second mapping position in the three-dimensional surface model according to the first mapping position and the determined distribution region comprises:
    determining a geometric center point in the distribution region; and
    determining the second mapping position on a line connecting the first mapping position to the geometric center point.

3. The method according to claim 2, wherein the operation of determining the second mapping position on the line connecting the first mapping position to the geometric center point comprises:
    determining a point of intersection between the line and a boundary of the distribution region; and
    determining a point spaced from the point of intersection, which is regarded as a starting point, by a distance of a seismic source diameter in a direction from the line to the geometric center point to serve as the second mapping position.

4. An electronic device, comprising a memory, a processor, and a computer program stored in the memory and able to run in the processor, wherein the processor performs operations of the method according to claim 3 when running the computer program.

5. A non-transitory computer-readable medium storing executable instructions that, in response to execution, cause a computer to perform operations of the method according to claim 3.

6. An electronic device, comprising a memory, a processor, and a computer program stored in the memory and able to run in the processor, wherein the processor performs operations of the method according to claim 2 when running the computer program.

7. A non-transitory computer-readable medium storing executable instructions that, in response to execution, cause a computer to perform operations of the method according to claim 2.

8. An electronic device, comprising a memory, a processor, and a computer program stored in the memory and able to run in the processor, wherein when the processor is running the computer program, performs operations of the method according to claim 1.

9. A non-transitory computer-readable medium storing executable instructions that, in response to execution, cause a computer to perform operations of the method according to claim 1.

* * * * *